(12) United States Patent
Springer (10) Patent No.: US 11,601,516 B2
(45) Date of Patent: Mar. 7, 2023

(54) DYNAMIC ALTERATION OF NOTIFICATION PREFERENCES WITHIN A COMMUNICATION PLATFORM

(71) Applicant: Zoom Video Communications, Inc., San Jose, CA (US)

(72) Inventor: Shane Paul Springer, Manchester, MI (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/390,664

(22) Filed: Jul. 30, 2021

(65) Prior Publication Data
US 2023/0030262 A1 Feb. 2, 2023

(51) Int. Cl.
*H04L 67/55* (2022.01)
*H04L 67/306* (2022.01)

(52) U.S. Cl.
CPC ............ *H04L 67/55* (2022.05); *H04L 67/306* (2013.01)

(58) Field of Classification Search
None
See application file for complete search history.

(56) References Cited

U.S. PATENT DOCUMENTS

| | | | |
|---|---|---|---|
| 10,686,740 B2* | 6/2020 | Alfaro | H04L 51/12 |
| 10,809,889 B2* | 10/2020 | Richman | H04N 21/2187 |
| 11,321,634 B2* | 5/2022 | Lee | G06N 20/00 |
| 2014/0188541 A1* | 7/2014 | Goldsmith | H04L 67/306 705/7.19 |
| 2020/0259948 A1* | 8/2020 | Keohane | H04L 67/306 |
| 2022/0038410 A1* | 2/2022 | Bhargava | H04L 51/34 |

\* cited by examiner

*Primary Examiner* — James A Edwards
(74) *Attorney, Agent, or Firm* — Cognition IP, P.C.; Edward Steakley; Aroon Karuna (57) ABSTRACT

Methods and systems provide for dynamically altering notification preferences within a communication platform. The system receives one or more future events and one or more past events associated with a user of a communication platform; a notification associated with a future event; and a user behavioral profile associated with the user. The system determines whether one of the future events coincides with the notification time for the notification. The system then deploys an artificial intelligence (AI) model to analyze the user behavioral profile with respect to the event notifications at the notification time, the one or more past events, and any coinciding future events, and provide, based on the analysis, a prediction score for whether notification preferences associated with the notification should be altered for the user at the notification time. Finally, the system alters the notification preferences if the prediction score meets or exceeds an alteration threshold.

20 Claims, 6 Drawing Sheets

DYNAMIC ALTERATION OF NOTIFICATION PREFERENCES WITHIN A COMMUNICATION PLATFORM

FIELD OF INVENTION

The present invention relates generally to digital communication, and more particularly, to systems and methods for dynamically altering notification preferences within a communication platform.

BACKGROUND

Digital communication tools and platforms have been essential in providing the ability for people and organizations to communicate and collaborate remotely, e.g., over the internet. In particular, there has been massive adopted use of communication platforms allowing for remote video sessions between multiple participants. Communications applications for casual friendly conversation ("chat"), webinars, large group meetings, work meetings or gatherings, asynchronous work or personal conversation, and more have exploded in popularity.

With the ubiquity and pervasiveness of remote video conversations, users of such communication platforms frequently find themselves in back-to-back scheduled events throughout the day, e.g., meetings, virtual gatherings of coworkers, and other events. Some users may have remote work meetings or other commitments booked constantly during work hours for a week or even several weeks in advance. Some may even have work meetings or events scheduled for non-work, personal hours. Related to these events, the user may also receive notifications from the communication platform hosting the events (via, e.g., video and/or audio communication sessions). Such notifications may interrupt users during other important work activities such as an event the user is participating in, or during personal experiences such as the user eating dinner with his family.

BRIEF DESCRIPTION OF THE DRAWINGS

The present invention relates generally to digital communication, and more particularly, to systems and methods providing for dynamic alteration of notification preferences within a communication platform.

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

There is a growing need from users to have tools and settings for communication platforms which address work-life balance, as more people are fusing working and non-working life in ways that previously were uncommon. Thus, a user may be frustrated by receiving a dozen or more notifications from a communication platform while the user is sitting down and eating with his family. Current solutions for altering notification preferences often do not have enough or any visibility into what activities are user is engaged in when a notification is to be displayed for that user, and what the user's behaviors and preferences may reveal about whether the user would prefer to have the notification's preferences altered during that time.

Thus, there is a need in the field of digital communication tools and platforms to create a new and useful system and method for dynamically altering notification preferences within a communication platform. The source of the problem, as discovered by the inventors, is a lack of ability to accurately predict whether a user would prefer to have a notification altered in some way during a specific time based on user behavior, preferences, and activities for that time.

The invention overcomes the existing problems by dynamically and intelligently altering notification preferences for a user of a communication platform based on an analysis of that user's behaviors, preferences, and activities for the time in which the notification is set to be displayed.

In one embodiment, the system receives one or more future events and one or more past events associated with a user of a communication platform; a notification associated with a future event, with a notification time being associated with each of the notifications, and a user behavioral profile associated with the user, including a plurality of user behaviors associated with event notifications and the one or more past events. The system then determines whether one of the future events coincides with the notification time for the notification. The system deploys an artificial intelligence (AI) model to analyze the user behavioral profile with respect to the event notifications at the notification time, the one or more past events, and any coinciding future events, and provide, based on the analysis, a prediction score for whether notification preferences associated with the notification should be altered for the user at the notification time. Finally, the system alters the notification preferences if the prediction score meets or exceeds an alteration threshold.

Further areas of applicability of the present disclosure will become apparent from the remainder of the detailed description, the claims, and the drawings. The detailed description and specific examples are intended for illustration only and are not intended to limit the scope of the disclosure.

By way of illustration of the systems and methods described herein, an employee of an organization may be sitting down to eat dinner with his family. As he eats with his family and makes conversation with them, he receives constant notifications from his smartphone (including vibrations within his pocket, since he set his smartphone to vibration-only mode for notifications) which are difficult to ignore. He wishes that the communication platform allowed him to alter notification preferences for some events, but not others, depending on how important they are to him. While he doesn't need the majority of the notifications, he does have a meeting with Sam after dinner that he wants to be reminded about. However, he only has access to phone-wide disabling of all notifications for the communication application at a certain time of the week, rather than only the most important ones.

Using the present systems and methods, however, the communication platform is able to receive at least one of the employee's past and future events and a user behavioral profile constituting the employee's behaviors and predilections regarding notifications and events, and can determine whether to alter notification preferences or not based on a prediction of whether the employee would want the notification preferences altered. The employee can also configure his working hours and/or "do not disturb" hours within the system, so that the system can more accurately predict when a notification's preferences should be altered. Thus, rather than several dozens of notifications during dinner, the employee only receives 1 notification regarding the meeting with Sam, and all others are disabled during that dinner.

In another example, a new chat group may be created, and an employee of an organization may be included in the chat group, as well as three people who are senior to him within the organization. The employee wants to know about any messages that are sent within the chat group, due to the senior coworkers included in the chat group. Even though the chat group is unrelated to any calendar events or existing chats, the system can deploy an AI model which is capable of learning from interactions from previous chats the employee has participated in. The AI model can thus evaluate user behaviors and make decisions about altering notification preferences based on those user behaviors.

I. Exemplary Environments

Figure 1A:
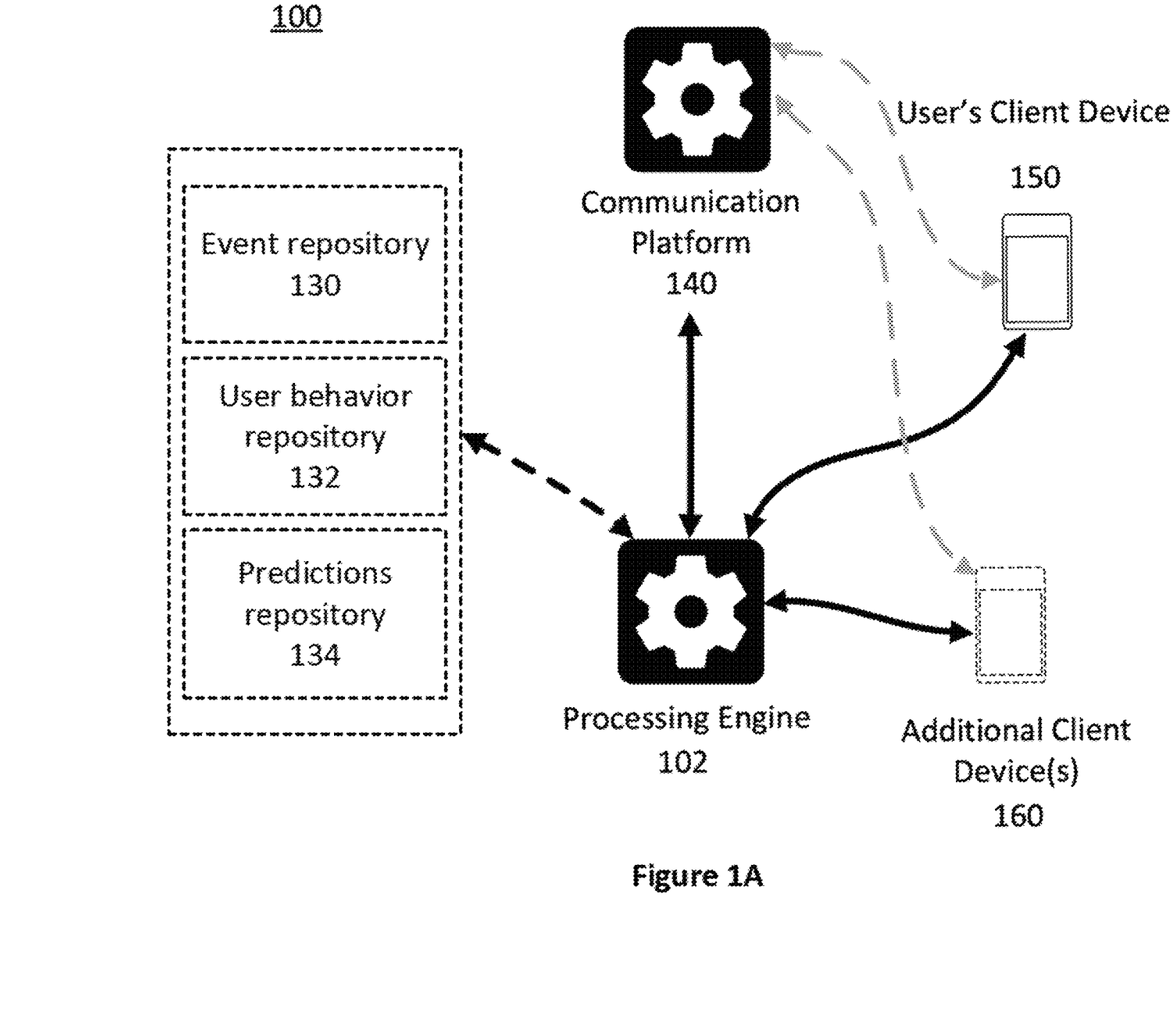
FIG. 1A is a diagram illustrating an exemplary environment in which some embodiments may operate.

FIG. 1A is a diagram illustrating an exemplary environment in which some embodiments may operate. In the exemplary environment 100, a user's client device 150 and one or more additional client device(s) 160 are connected to a processing engine 102 and, optionally, a communication platform 140. The processing engine 102 is connected to the communication platform 140, and optionally connected to one or more repositories and/or databases, including, e.g., an event repository 130, user behavior repository 132, and/or a predictions repository 134. One or more of the databases may be combined or split into multiple databases. The user's client device 150 and additional client device(s) 160 in this environment may be computers, and the communication platform 140 and processing engine 102 may be applications or software hosted on a computer or multiple computers which are communicatively coupled via remote server or locally.

The exemplary environment 100 is illustrated with only one additional user's client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
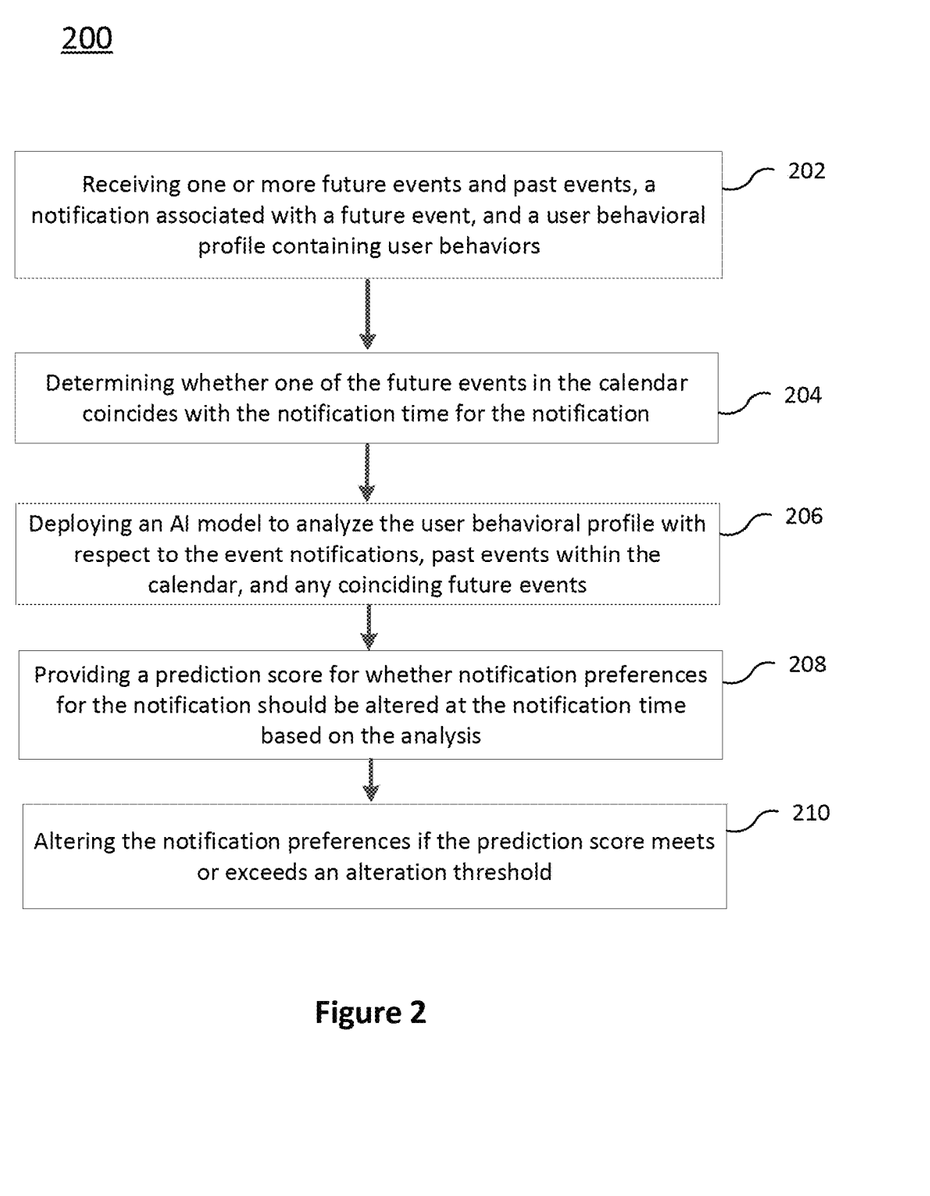
FIG. 2 is a flow chart illustrating an exemplary method that may be performed in some embodiments.

In an embodiment, the processing engine 102 may perform the exemplary method of FIG. 2 or other method herein and, as a result, provide for dynamic alteration of notification preferences within a communication platform. In some embodiments, this may be accomplished via communication with the user's client device, additional client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The user's client device 150 and additional client device(s) 160 are devices with a display configured to present information to a user of the device. In some embodiments, the client devices present information in the form of a user interface (UI) with multiple selectable UI elements or components. In some embodiments, the client devices 150 and 160 are configured to send and receive signals and/or information to the processing engine 102 and/or communication platform 140. In some embodiments, the client devices are computing devices capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client devices 150 and/or 160. In some embodiments, one or more of the communication platform 140, processing engine 102, and client devices 150 and 160 may be the same device. In some embodiments, the user's client device 150 is associated with a first user account within a communication platform, and the additional client device(s) 160 are associated with additional user account(s) within a communication platform.

In some embodiments, optional repositories can include one or more of an event repository 130, user behavior repository 132, and/or predictions repository 134. The optional repositories function to store and/or maintain, respectively, one or more future events and past events associated with a user of the communication platform 140 (and, in some embodiments, calendar information associated with the user and/or additional users); user behaviors detected or identified for a user within the communication platform; and predictions relating to whether notification preferences should be altered, including a prediction score for each. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, video conference or meeting, message board or forum, virtual meeting, or other form of digital communication. The communication session may be one-to-many (e.g., a speaker presenting to multiple attendees), one-to-one (e.g., two friends speaking with one another), or many-to-many (e.g., multiple participants speaking with each other in a group video setting).

Figure 1B:
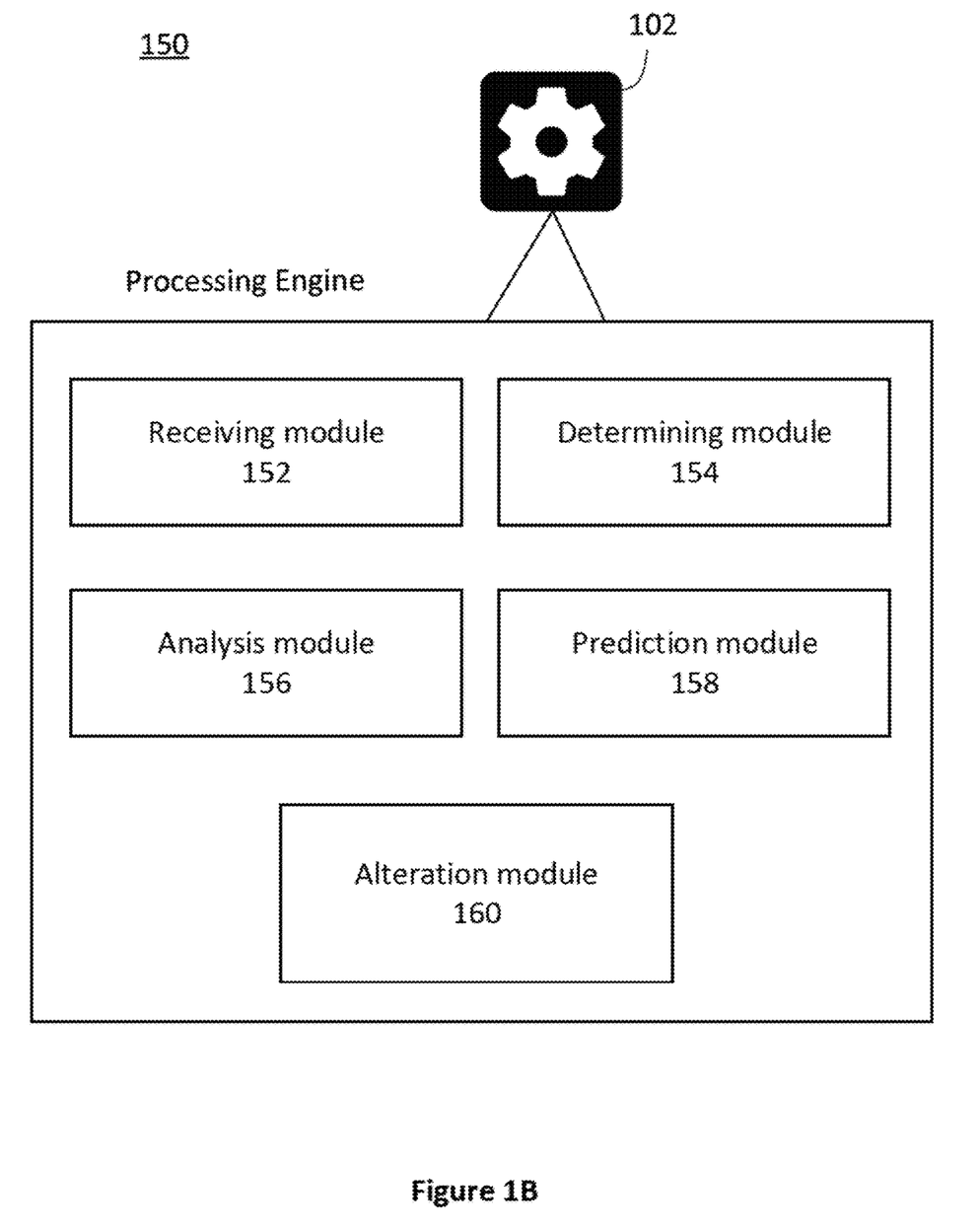
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module functions to receive one or more pieces of data which will be used by the system, including at least one or more future events and one or more past events; a notification associated with a future event; and a user behavioral profile associated with the user.

Determining module 154 functions to determine whether one of the future events coincides with the notification time for the notification.

Analysis module 156 functions to analyze the user behavioral profile with respect to the event notifications, the one or more past events, and any coinciding future events.

Prediction module 158 functions to provide a prediction score for whether the notification's preferences should be altered for the user at the notification time, based on the analysis.

Alteration module 160 functions to alter the notification's preferences if the prediction score meets or exceeds an alteration threshold.

The above modules and their functions will be described in further detail in relation to an exemplary method below.

II. Exemplary Method

FIG. 2 is a flow chart illustrating an exemplary method that may be performed in some embodiments.

At step 202, the system receives one or more future events and one or more past events, a notification associated with a future event, and a user behavioral profile containing user behaviors.

In various embodiments, an event may constitute one or more of any communications which can occur on a communication platform. For example, an event may be, e.g., a meeting between two people, a meeting between many people, a chat message, a chat session, synchronous or asynchronous communications, administrative communications, a document collaboration session, or any other suitable communications on a communications platform. In some embodiments, only, e.g., meetings may qualify as events, while in others, only chat messages may constitute events. Many such combinations and possibilities can be contemplated.

In some embodiments, the system receives a calendar associated with a user of a communication platform, where the calendar includes the one or more future events and the one or more past events. In some embodiments, the calendar associated with the user is a calendar internal to the communication platform. In other embodiments, the calendar is external to the communication platform, and may be developed and/or maintained by a third party. In some embodiments, the communication platform integrates the calendar functionality into the platform, and/or connects to the calendar via a remote network or cloud solution. In yet other embodiments, events may be completely separate conceptually from a calendar, including being separate from meetings or other events scheduled within a calendar.

In some embodiments including a calendar, the calendar includes a list of dates associated with information about events scheduled for particular dates, e.g., time and length of event, name of event, participants, link to the communication platform session for holding the event, and any other suitable information for an event on a communication platform that has been scheduled. In some embodiments, the calendar includes one or more personal events in addition to the one or more work events. In some embodiments, multiple calendars for the user may be received and used within the system, including, e.g., one work calendar and one personal calendar for the user. In some embodiments, a single calendar may include both personal events and work events.

In some embodiments, the calendar includes information on past events, including one or more of, e.g., names of past events, participants of past events, whether the user in question accepted, attended, participated in, or was engaged in the past events (as will be described in further detail below), dates and times for past events, and any other suitable information about past events which may be relevant. In some embodiments, the information includes information about notifications for those past events, including whether a user altered notification preferences about the event, ignored the notifications or opted to close the notification without viewing it, or engaged with the notification by viewing it.

In some embodiments, the notification associated with the future event may be any form of notification received on a user device, such as, e.g., a push notification on a smartphone, a notification received and displayed within a desktop interface of a computer, a text message, an audio cue or activation of vibration within a user device, lights flashing on the device or a screen of the device being activated from a sleep mode, or any other suitable notification. An example of a notification received on a user device is illustrated with respect to FIG. 3, which will be described in further detail below.

In some embodiments, the user behavioral profile contains user behaviors which have been associated with the user regarding historical behaviors and preferences in relation to notifications and past events. In some embodiments, these user behaviors and preferences are detected by the system, generated, and stored in the user behavioral profile. In other behaviors, the user behaviors can be retrieved from one or more other locations, such as data received from the user device about notification behavior, or from the user themselves via one or more UI mechanisms for sharing user behaviors and preferences with the system. In some embodiments, the user behaviors constitute insights about how the user behaves, and their habits and predilections in relation to notifications for a myriad of activities within the communication platform as well as various times throughout the day and other factors.

In some embodiments, at least a subset of the user behaviors associated with past requested events relates to how users behaved with respect to notifications about past events, how important the past events were to the user (including, e.g., whether the user attended the event, participated in the event, was engaged with the event, etc.). In some embodiments, whether the user accepted or declined an event upon receiving an event invite is relevant information in terms of whether the user considers the event to be important enough to attend. If the user declined an event, the system may determine one or more user behaviors representing common factors or patterns in meetings the user declines. For example, a user may decline events with 200 participants or more, but accept events with 50 or fewer participants, which creates a pattern which can be used to predict that a user will be likely to want to receive a notification about similar events.

In some embodiments, at least a subset of the user behaviors associated with past requested events relates to attending or not attending the past requested events that have been accepted. In some cases, users may accept an event invitation, but then not attend that event. User behaviors may be generated containing some predilections of the user for what sorts of events the user is likely to accept but not attend. For example, a user may always accept events for a weekly social hour, but may only be able to attend the social hour 10% of the time. The user behavior generated may thus reflect this likelihood of the user wanting a notification about that event. In another example, the user may attend 100% of events within their own team, but may accept but not attend 100% of events outside of their own team. This is also a user behavior which may be determined and generated.

In some embodiments, at least a subset of the user behaviors associated with past requested events relates to the user participating or not participating in the past requested events that were attended by the user. In various embodiments, participating can include one or more of, e.g., contributing vocally to the event, broadcasting a video feed, screen sharing, document collaboration, and textual messaging within the event interface. Such user behaviors may be relevant because even though a user may accept an event invitation and even attend the event in question, the user may still not participate in the event, and may choose to disable both their audio and video broadcasting throughout the full duration of the event. The likelihood of the user not wanting to receive a notification for that event may increase if the user typically does not participate in similar events.

In some embodiments, at least a subset of the user behaviors associated with past requested events relates to user engagement within the past requested events that were attended by the user. In various embodiments, user engagement can include one or more of, e.g., visual engagement via eye tracking, whether the event is within an active window of the user environment, and percentage of the event attended. Engagement when attending an event is often a good indicator of how important or not important the user considers the event to be. For example, a user may be fully engaged during events with his supervisor, and this manifests as always having the event window as the dominant active window within the user's browser of communication application, expanding the window to better view shared material, having their eyes track aspects of the event (thus demonstrating a focused attention on the event), and more. Conversely, if the user is attending a 250-person event for a department other than the user's own which the user is not interested in engaging with, the user behaviors for that event may include, e.g., having the window minimized or not visible on the user's screen, leaving the event early (e.g., 50% of the way through the duration of the event when other participants remain for the full duration), participating in asynchronous chat or conversation within the communication session, clicking on different elements within the communication session window, and more.

In some embodiments, at least a subset of the user behaviors associated with past requested events relates to a likelihood the user will attend an event with one or more specific additional users. In some embodiments, the one or more specific additional users are users within a particular hierarchy or subhierarchy of an organization. A user will be more likely to consider a notification about an event important if their direct supervisor attends the event, for example, or if one of the colleagues they work closely with daily is hosting an event. In some embodiments, the system can receive hierarchical, sub-hierarchical, or other organizational information with respect to a user of the communication platform, and use this information to determine new user behaviors for users with respect to events within that organizational hierarchy.

For example, a user may be part of a premium business account within the communication platform that includes all employees of the organization. The organization provides information to the communication platform about the organizational hierarchy of that organization, includes names of users and their place within the hierarchy. The system can then use this information to determine relevant insights about user behavior. In some embodiments, the system may determine that the closer a user is to another user within the organizational structure, the more likely they will be to want to receive notifications about events with that user.

In some embodiments, at least a subset of the user behaviors associated with the past requested events relate to recurring events. Such recurring scheduled events can lead to important insights about user behavior with respect to that set of recurring events as well as other types of recurring events with may share similar qualities (e.g., same or similar participants, same departments, same subject matter, etc.) One example of a user behavior may be that a user has accepted all future recurring events for a particular weekly event, but never attends the events, or is never engaged nor participating within the event. In such a case, it is more likely that the user does not want to receive a notification about that event in a given time.

In some embodiments, at least a subset of the user behaviors relates to notification rules for the user. In some embodiments, the system receives or generation notification rules for the user, and then adds those notification rules to the user behavioral profile to be included in the analysis of the user behavior profile for prediction purposes. Notification rules may relate to one or more protocols with respect to altering notification preferences. In some embodiments, notification rules may take some conditional form. For example, a notification rule may stipulate that if the user is at dinner, defined as between 6-7:30 PM every day, all notifications are to be disabled. More complex notification rules can be received or generated. In some embodiments, users may be able to configure or generate their own notification rules within a preferences interface. In some embodiments, the system may periodically provide one or more recommendations of notification rules to the user. For example, upon a notification preference being altered, the decision may be placed within an altered notifications digest which is periodically presented to the user, or presented within a preferences interface. The recommendation about that decision can be presented to them, and a notification rule can be generated if the user indicates it should be generated.

In some embodiments, the system provides, to the user, recommendations of one or more notification rules for the user, then receives confirmation or rejection from the user to add at least a subset of the notification rules to the user behavioral profile. If a confirmation is received, the system adds the notification rules to the user behavioral profile to be included in the analysis of the user behavioral profile. In some embodiments, the system can additionally feed the confirmation or rejection from the user back into the AI model to improve generation of future prediction scores. This may be achieved by, e.g., reinforcement learning, closed-circuit reward-based feedback circuits, or any other suitable technique.

In some embodiments, device telemetry can be used to determine one or more activities that the user is engaging with on the phone, which can be added to user behaviors and added to the analysis of whether to alter notifications preferences. For example, a user may be taking a picture, on a phone call with someone, or performing some other activity for which he does not want to be distracted. The phone may also indicate that the user is in motion. If the user is currently walking somewhere or engaged in exercise, the notification preferences may be more likely to be altered to disable or delay the notification. If the user is detected to be driving, then the notification is also more likely to be disabled or delayed to a later time.

At step 204, the system determines whether one of the future events coincides with the notification time for the notification. If a user is engaged in another event at the time the notification is set to be displayed for that user, there will be a higher likelihood that the user wants that notification to be altered during that time. Thus, whether any future events coincide with that notification is relevant to a determination about whether to alter notification preferences.

In various embodiments, altering a notification may equate to different actions depending on different embodiments, situations, or contexts. In some embodiments, altering a notification may be performed by muting the notification or removing the notification. In some embodiments, the notification may be delayed in time. In other embodiments, altering a notification may involve, for example, switching the notification from a visual-only (e.g., written textual) notification to an audio-only notification, from an audio-only notification to a visual-only notification, from a visual-only notification to a haptic-only notification (e.g., vibration-based notification), or from a phone-based push notification to an email message. In some embodiments where text is displayed in relation to a notification, the text itself may be altered (for example, a shorter message may appear than the original message to be displayed). Many other forms of altering the notification may be contemplated.

At step 206, the system deploys an artificial intelligence ("AI") model to analyze the user behavioral profile with respect to the notifications, past events, and any coinciding future events.

Figure 4:
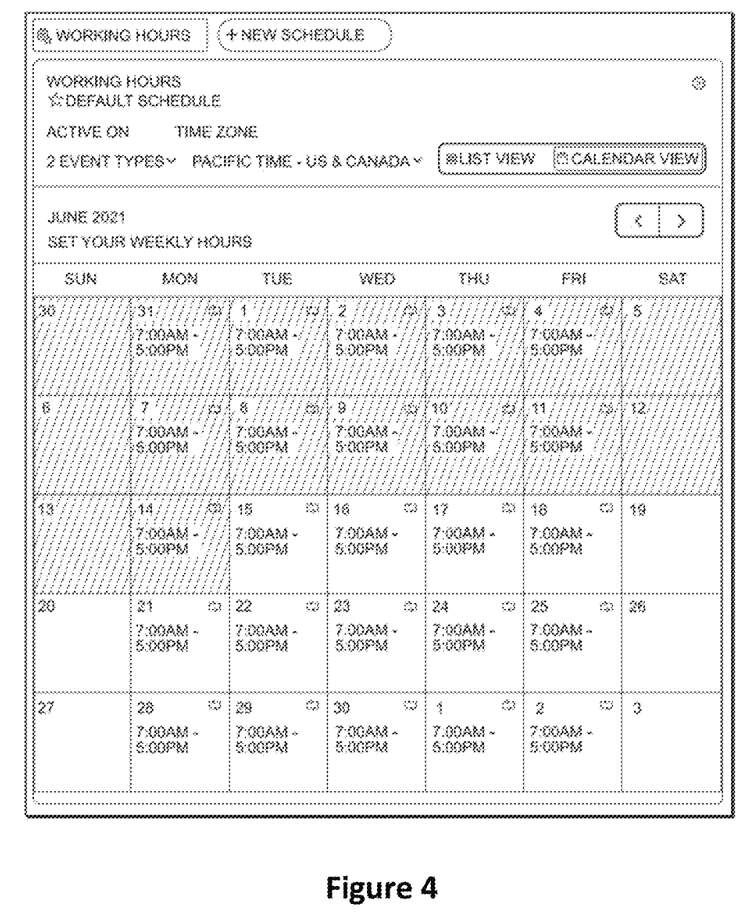
FIG. 4 is a diagram illustrating one example embodiment of a UI for setting desired working hours within a communication platform, according to some embodiments.

In some embodiments, users can specify desired working hours or acceptable times for receiving notifications. The system will take such times into account when determining whether to alter notifications preferences. One example of a user interface for establishing or configuring desired working hours is illustrated in FIG. 4, which will be described in detail further below.

In some embodiments, the importance of the notification time, or time block in which the notification time occurs, can be taken into account when determining whether to alter notification preferences. In various embodiments, the importance of the current time block can be influenced by one or more of: desired working hours; if the user has historically interacted during that time block with notifications; if the event is a specific type of event the user has considered to be important, based on past behavior; if the user has an "out of office" flag set up during the time block (which would have a higher priority than a generic meeting); or any other suitable factors for a time block to be considered important.

In some embodiments, the deployed AI model may include AI-based processes and techniques, such as, e.g., machine learning or deep learning. In some embodiments, the AI model utilizes neural networks, such as, e.g., convolutional neural networks ("CNNs"), recurrent neural networks ("RNNs") long short term memory ("LSTM"), and deep neural networks ("DNNs"). In some embodiments, the AI model can be trained on datasets relating to users, past events, previous notifications, previous AI-generated predictions relating to altering notification preferences, and more. In some embodiments, the AI model is trained on at least one or more datasets comprising user behavioral profiles for users of the communication platform with respect to notifications for past events.

In some embodiments, the AI model is trained to classify or predict values relating to user behaviors from the user behavioral profile as well as the similar past requested events. If a user behaved in a certain way with respect to notifications for past events that are similar to the event the notification is about, then the user is likely to behave in similar ways with respect to the present notification in question. For example, if events hosted by a certain department are always accepted but never attended, then there is a high likelihood that the event in question, which is also hosted by the department and was accepted by the user, will also not be attended. The system analyzes the user behavioral profile and similar past requested events to generate such connections and/or likelihood values between past events and the event in question.

At step 208, the system provides a prediction score for whether the notification preferences should be altered at the notification time based on the analysis. The prediction score functions as a confidence score with regard to how likely it is that the user will want the notification preferences to be altered during this time. The analysis from step 206 is used to generate the prediction score based on whether past similar events had previous behaviors associated with them that point toward altering the notification preferences, including the user's behaviors with respect to that event (e.g., the user accepted or didn't accept, the user attended or didn't attend, the user participated or didn't participate, the user was engaged during the event or not, etc.) as well as the user's behaviors with respect to notifications for that event (ignored, closed without viewing, viewed, etc.) As mentioned above, in some embodiments, the prediction score is generated via an AI model which the system deploys. In some embodiments, a consistent system or metric is employed by the AI model such that prediction scores are all generated with the same metrics, and can be readily compared to one another or ranked for various purposes.

At step 210, the system alters the notification's preferences if the prediction score meets or exceeds an alteration threshold. In various embodiments, the notification's preference may be altered by, e.g., disabling the notification, reducing the velocity and/or volume of the notification, and/or delaying the notification. For example, an employee may want to leave the notification enabled so that it notifies him of a particular event, but he may nevertheless wish to reduce the amount (i.e., volume) of times notifications appear with respect to the event.

In some embodiments, an alteration threshold may be a predefined, pre-established threshold for identifying within the system whether the prediction score is high enough for the system to alter the notification's preferences. In some embodiments, determining that the prediction score for the notification meets or exceeds a similarity threshold involves determining whether the system has decided that notification's preferences should be altered often, sometimes, or rarely, e.g., the lower the alteration threshold is set, the more common altered notifications will be, and the higher the alteration threshold is set, the less common altered notifications will be. In some embodiments, rather than the alteration threshold being a predefined or pre-established threshold, it is dynamically determined based on one or more factors, with different users potentially having different alteration thresholds based on, e.g., user behaviors, organizational title or hierarchical position, department, or other relevant factors.

In some embodiments, the AI model is deployed in real time or substantially real time, at the moment of, or just prior to the notification time for that notification. Thus, the AI model can factor in what the user is currently engaged in on the device or whether an event is currently being held that the user is participating in, or other suitable events that the user is engaged in at that precise moment.

In some embodiments, the system provides, to the user via the user client device, a decision digest comprising one or more decisions made with respect to altering notification preferences. Thus, a user can quickly see at a glance what decisions for altering notification preferences were made. In some embodiments, the user can quickly select an option to agree or disagree with the decisions to alter the notification's preferences, and can opt to not have that notification's preferences altered in the future. Thus, the user can be empowered to make decisions regarding altering of notification preferences within an easy, consolidated format. In some embodiments, the digest may be configured either by default or by the user to be presented to the user daily, weekly, monthly, or at any other interval. In some embodiments, the user must go to a preferences interface in order to view the decision digest.

In some embodiments, the decision digest further includes one or more reasons for why the notification's preferences were altered. In some embodiments, there may be a messaged associated with each alteration decision. For example, a message may read, "we altered this notification's preferences to alter notification preferences at this time block because you stated that 8 pm is outside of your designated working hours, and because you haven't attended previous events in this series of recurring events." In some embodiments, the user can configure one or more decisions to be recurring decisions, i.e., can select decisions to be made again in future similar circumstances.

In some embodiments, the system can notify one or more users associated with administration of the future event that the user is in a period of unavailability. For example, if a particular user is trying to reach another user and sends multiple chat messages to that user to try to reach him, the system can notify the first user that the second user is currently unavailable and not receiving notifications of the chat messages.

Figure 3:
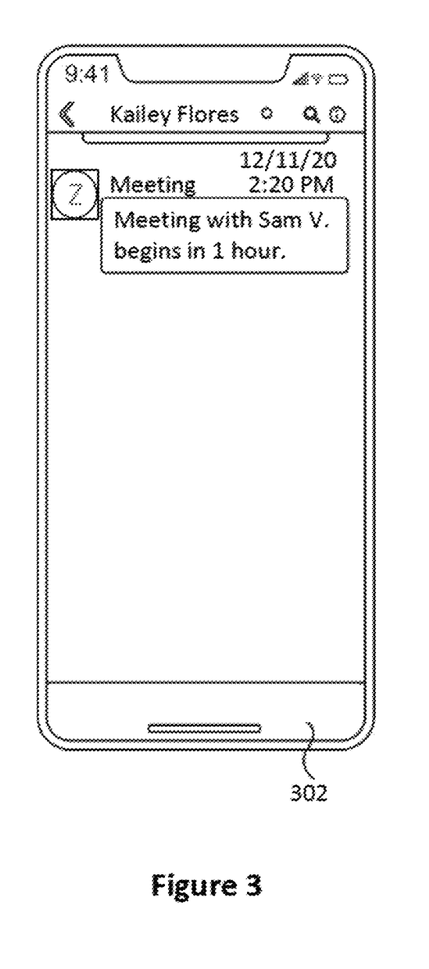
FIG. 3 is a diagram illustrating one example embodiment of a notification for a communication platform displayed on a user device, according to some embodiments.

FIG. 3 is a diagram illustrating one example embodiment of a notification for a communication platform displayed on a user device, according to some embodiments. User device 302 shows a lock screen with a single notification on it. The notification originates from, and was generated by, a communication application, and the notification is in the form of a push notification on a lock screen of the user's smartphone. The notification was sent at 2:20 PM, and informs the user of the user device about a meeting with Sam V. which begins in 1 hour from the time of notification. In some embodiments, depending on the settings and functions of the user device, the notification may be accompanied by an audio cue, vibration from the device, a lighting up of the device or activation of the screen from sleep mode, or some combination thereof.

The user may not receive such a notification if, based on the systems and methods described here, the system predicts that the user would prefer to have this notification altered at 2:20 PM, because of one or more other factors. For example, the user may be currently engaged in a meeting in which he is presenting on a topic, and needs his full focus directed to doing so. The user may also never attend similar meetings with Sam V, or may attend them but not participate because he is just listening in on someone else participating without being engaged himself. If the notification is disabled, then the user's lock screen will be free.

FIG. 4 is a diagram illustrating one example embodiment of a UI for setting desired working hours within a communication platform, according to some embodiments. Within the UI, a user associated with a calendar can opt to configure the calendar such that certain designated working hours or desired hours can be set. In some embodiments, these hours can be set on a weekly or, potentially, daily basis. These working hours designate time ranges for which the user is, in various embodiments or preferences, more amenable to receiving notifications, does not wish to receive notifications, or wishes to receive notifications only for work-related and/or important events. In some embodiments, a user can additionally or alternatively set designated non-working hours for which notification's preferences should be altered. In some embodiments, this preference does not apply to altering notification preferences for important events.

Figure 5:
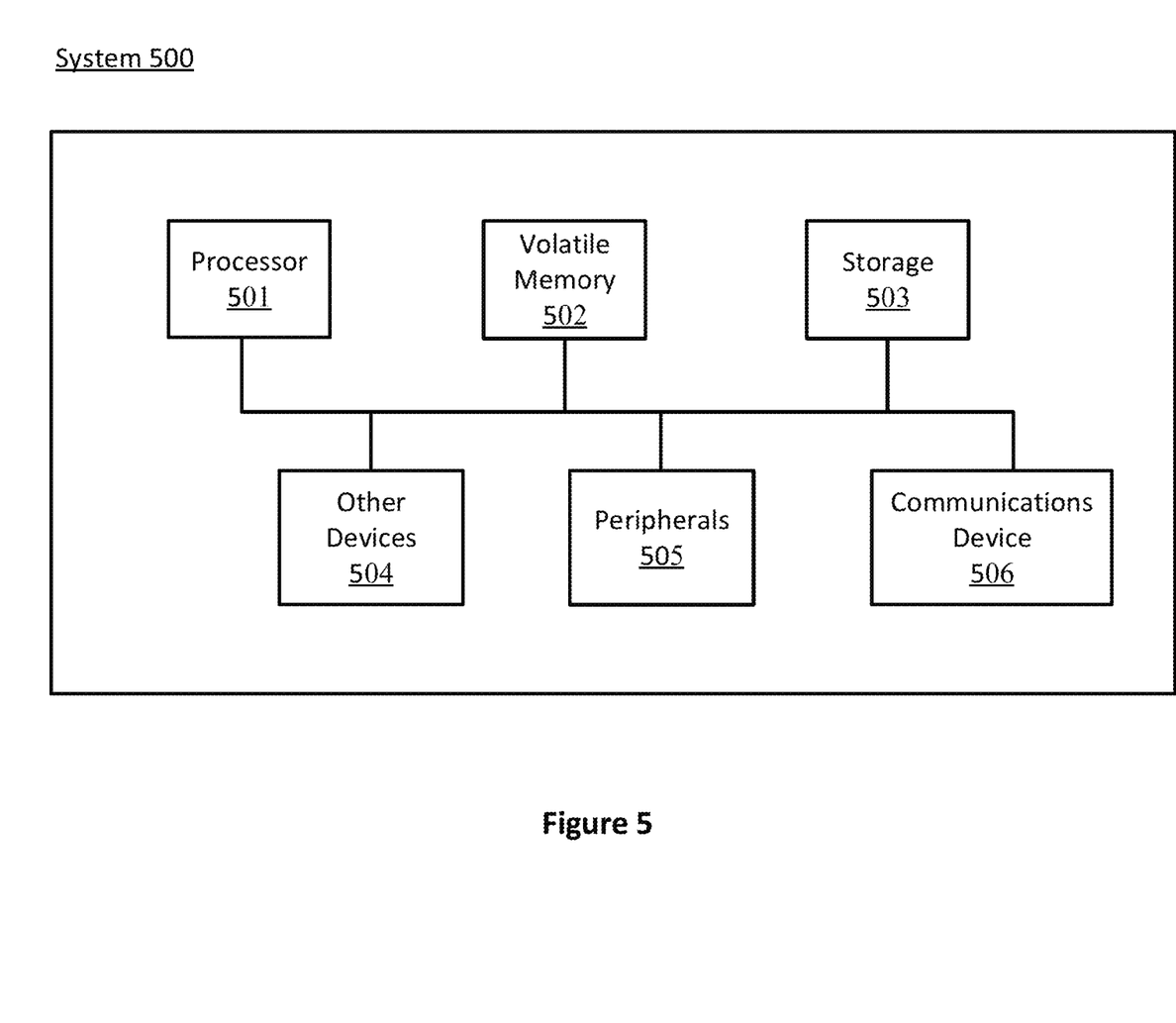
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for dynamically altering notification preferences within a communication platform, comprising:
   receiving:
      one or more future events and one or more past events associated with a user of a communication platform,
      a future notification associated with a future event from the one or more future events, a scheduled notification time being associated with the future notification, and
      a user behavioral profile associated with the user, comprising a plurality of user behaviors associated with event notifications and the one or more past events;
   determining whether an additional event from the one or more future events coincides with the scheduled notification time for the future notification;
   at the scheduled notification time, detecting, via device telemetry for a user device, user attendance and engagement during the additional event;
   deploying an artificial intelligence (AI) model to:
      analyze the user behavioral profile and the detected user attendance and engagement during the additional event, and
      provide, based on the analysis, a prediction score for whether notification preferences associated with the future notification should be altered for the user at the scheduled notification time; and
   altering the notification preferences based on the prediction score meeting or exceeding an alteration threshold.

2. The method of claim 1, wherein the notification preferences are altered to provide one or more of: disabling the future notification, reducing a velocity and/or volume of the future notification, and/or delaying the future notification.

3. The method of claim 1, wherein the AI model is trained on at least one or more datasets comprising user behavioral profiles for users of the communication platform with respect to notifications for past events.

4. The method of claim 1, further comprising:
   receiving a calendar associated with the user of the communication platform, wherein the calendar comprises the one or more future events and the one or more past events.

5. The method of claim 1, further comprising:
   receiving or generating desired work hours for the user; and
   adding the desired work hours to the user behavioral profile to be included in the analysis of the user behavioral profile.

6. The method of claim 1, further comprising:
   receiving or generating one or more notification rules for the user; and
   adding the notification rules to the user behavioral profile to be included in the analysis of the user behavioral profile.

7. The method of claim 1, further comprising:
providing, to the user, recommendations of one or more notification rules for the user;
receiving confirmation or rejection from the user to add at least a subset of the notification rules to the user behavioral profile; and
if a confirmation is received, adding the notification rules to the user behavioral profile to be included in the analysis of the user behavioral profile.

8. The method of claim 7, further comprising:
feeding the confirmation or rejection from the user back into the AI model to improve generation of future prediction scores.

9. The method of claim 1, wherein altering the future notification's preferences comprises at least disabling at least one of a push notification, audio signal, or vibration signal with respect to the future notification on at least one user device.

10. The method of claim 1, further comprising:
notifying one or more users associated with administration of the future event that the user is in a period of unavailability.

11. The method of claim 1, further comprising:
detecting one or more activities the user is engaged with via a user device, wherein the activities are analyzed along with the user behavioral profile to determine whether to alter the notification preferences.

12. The method of claim 11, wherein the one or more activities relate to the user being in motion.

13. The method of claim 12, wherein the one or more activities relate to another event the user is attending.

14. The method of claim 13, wherein the activities are further analyzed based on detected participation and/or engagement of the user within the event.

15. The method of claim 1, wherein the AI model is deployed in real time at the scheduled notification time.

16. The method of claim 1, wherein the user behavioral profile further comprises information about one or more hosts or participants of the event, and wherein the information further comprises whether the hosts or participants are within a particular hierarchy or sub-hierarchy of an organization in relation to the user.

17. The method of claim 1, further comprising:
providing a decision digest to the user comprising one or more decisions made with respect to altering notification preferences.

18. The method of claim 17, wherein the user can configure one or more decisions to be recurring decisions.

19. A communication system comprising one or more processors configured to perform the operations of:
receiving:
one or more future events and one or more past events associated with a user of a communication platform,
a future notification associated with a future event from the one or more future events, a scheduled notification time being associated with the future notification, and
a user behavioral profile associated with the user, comprising a plurality of user behaviors associated with event notifications and the one or more past events;
determining whether an additional event from the one or more future events coincides with the scheduled notification time for the future notification;
at the scheduled notification time, detecting, via device telemetry for a user device, user attendance and engagement during the additional event;
deploying an artificial intelligence (AI) model to:
analyze the user behavioral profile and the detected user attendance and engagement during the additional event,
and provide, based on the analysis, a prediction score for whether notification preferences associated with the future notification should be altered for the user at the scheduled notification time; and
altering the notification preferences based on the prediction score meeting or exceeding an alteration threshold.

20. A non-transitory computer-readable medium containing instructions for dynamically altering notification preferences within a communication platform, comprising:
instructions for receiving:
one or more future events and one or more past events associated with a user of a communication platform,
a future notification associated with a future event from the one or more future events, a scheduled notification time being associated with the future notification, and
a user behavioral profile associated with the user, comprising a plurality of user behaviors associated with event notifications and the one or more past events;
instructions for determining whether an additional event from the one or more future events coincides with the scheduled notification time for the future notification;
at the scheduled notification time, instructions for detecting, via device telemetry for a user device, user attendance and engagement during the additional event;
instructions for deploying an artificial intelligence (AI) model to:
analyze the user behavioral profile and the detected user attendance and engagement during the additional event, and
provide, based on the analysis, a prediction score for whether notification preferences associated with the future notification should be altered for the user at the scheduled notification time; and
instructions for altering the notification preferences based on the prediction score meeting or exceeding an alteration threshold.

* * * * *